US012570338B2

(12) United States Patent
Oh et al.

(10) Patent No.: US 12,570,338 B2
(45) Date of Patent: Mar. 10, 2026

(54) HOIST COMMUNICATION DEVICE IN RAIL CAR OF AUTOMATED MATERIAL HANDLING SYSTEM

(71) Applicant: CANTOPS CO., LTD., Gyeonggi-do (KR)

(72) Inventors: Hak Seo Oh, Gyeonggi-do (KR); Jin Hwan Ko, Seoul (KR); Sung Ik Kim, Gyeonggi-do (KR); Sung Hyuk Youn, Incheon (KR); Youl Kwon Sung, Gyeonggi-do (KR); Hee Hyun Seo, Gyeonggi-do (KR); Seung Hwan Lee, Gyeonggi-do (KR); Deok Ha Lee, Gyeonggi-do (KR); Se Hun Lee, Gyeonggi-do (KR); Hyeong Cheol Choi, Gyeonggi-do (KR)

(73) Assignee: CANTOPS CO., LTD., Gyeonggi-do (KR)

( * ) Notice: Subject to any disclaimer, the term of this patent is extended or adjusted under 35 U.S.C. 154(b) by 726 days.

(21) Appl. No.: 18/095,110

(22) Filed: Jan. 10, 2023

(65) Prior Publication Data

US 2023/0249722 A1 Aug. 10, 2023

(30) Foreign Application Priority Data

Feb. 7, 2022 (KR) ........................ 10-2022-0015306

(51) Int. Cl.
| | |
|---|---|
| *B61L 15/00* | (2006.01) |
| *B66C 13/14* | (2006.01) |
| *B66C 13/40* | (2006.01) |
| *B66C 13/44* | (2006.01) |
| *B66C 13/46* | (2006.01) |

(Continued)

(52) U.S. Cl.
CPC .......... *B61L 15/0018* (2013.01); *B66C 13/14* (2013.01); *B66C 13/40* (2013.01); *B66C 13/44* (2013.01); *B66C 13/46* (2013.01); *B66C 13/48* (2013.01); *H04B 3/54* (2013.01); *H04B 17/318* (2015.01)

(58) Field of Classification Search
CPC ......... B66C 13/14; B66C 13/40; B66C 13/46; B66C 13/48; B66C 13/44; B61L 15/0018; H04B 17/318; H04B 3/54
See application file for complete search history.

(56) References Cited

U.S. PATENT DOCUMENTS

| | | | | |
|---|---|---|---|---|
| 2001/0008391 A1* | 7/2001 | Yuasa | ................. | H04L 12/2803 |
| | | | | 725/79 |
| 2006/0291575 A1* | 12/2006 | Berkman | ............ | H04L 63/0471 |
| | | | | 375/257 |

(Continued)

FOREIGN PATENT DOCUMENTS

| | | | | |
|---|---|---|---|---|
| KR | 101419356 B1 * | 7/2014 | | |
| KR | 1020190093333 | 8/2019 | | |
| WO | WO-2020016625 A1 * | 1/2020 | ............... | B66D 3/26 |

*Primary Examiner* — Yong Hang Jiang
(74) *Attorney, Agent, or Firm* — IPLA P.A.

(57) ABSTRACT

A hoist communication device in a rail car of an automated material handling system in which a master communication unit and a slave communication unit perform power line communication through one power supply line provided on a belt and a rail car controller connected to the master communication unit is individually communicated with a plurality of gripper devices connected to the slave communication unit using different carrier frequencies.

8 Claims, 6 Drawing Sheets

(51) Int. Cl.
    B66C 13/48         (2006.01)
    H04B 3/54         (2006.01)
    H04B 17/318     (2015.01)

(56)           References Cited

U.S. PATENT DOCUMENTS

2014/0226732 A1*   8/2014   Wang ........................ H04B 3/54
                                      375/257
2019/0238182 A1*   8/2019   Oh ........................... H04B 3/54

\* cited by examiner

FIG. 1C

HOIST COMMUNICATION DEVICE IN RAIL CAR OF AUTOMATED MATERIAL HANDLING SYSTEM

BACKGROUND

The present invention relates to a hoist communication device in a rail car of an automated material handling system, and to technology in which a master communication unit and a slave communication unit perform a power line communication through one power supply line provided on a belt and a rail car controller connected to the master communication unit is individually communicated with a plurality of gripper devices connected to the slave communication unit using different carrier frequencies.

Generally, in manufacturing processes of a semiconductor element and a liquid crystal display device etc., the manufacturing goods are transferred to the manufacturing equipment of each manufacturing process by using an automated material handling system (AMHS), so that the corresponding goods are manufactured according to the manufacturing processes of each manufacturing equipment. Such an automated material handling system utilizes a rail car for transferring a carrier of receiving a semiconductor substrate or a liquid crystal substrate to the manufacturing station located on the manufacturing process line and transferring the carrier of again receiving the goods completely processed in the corresponding manufacturing equipment to the next manufacturing equipment.

In general, the rail car allows a gripper-unit to move up and down by means of a belt, so that it carries the carrier onto or carries the carrier out the manufacturing equipment.

In this regard, Korean Patent Registration No. 10-2020662 discloses a communication method between a master communication device and a slave communication device for controlling a gripper-unit in a hoist device of a rail car.

At this time, in the structure of the mutual communication through one transmission line as described above, the periodic communication in which the communication is made by mutual agreement at regular intervals of time is performed.

Therefore, a device that notifies an emergency that requires real-time control and communication or a device that needs to be controlled and communicated in a certain period is bound to be bundled into one communication system, and thus various control problems are inevitable. In addition, since the communication performance required in each communication system is dependent on "communication system to transmit after collection", a communication delay may occur. Moreover, when a real-time data transmission is required in the periodic communication system, limitations in system operation such as operation delay may occur.

Patent Literature 1: Korean Patent Registration No. 10-2020662 (Sep. 4, 2019)

SUMMARY OF THE INVENTION

The present invention has been made in consideration of the problems described above and an object of the present invention is to provide a hoist communication device in a rail car of an automated material handling system in which a master communication unit and a slave communication unit of a hoist device perform a power line communication using one power supply line provided in a belt and a plurality of communication paths is formed using different carrier frequencies, so that a rail car controller can be individually communicated with motors and various sensors inside a gripper.

According to an aspect of the invention to achieve the object described above, there is provided a hoist communication device in a rail car of an automated material handling system, in which a master communication device connected to a rail car controller and a slave communication device connected to a gripper-unit are connected through a belt to operate the gripper-unit in accordance with a control signal of the rail car controller, thereby performing a hoist work, the hoist communication device including: the master communication device that allocates different carrier frequencies for each gripper device identification information to be modulated, when a control signal including the gripper device identification information corresponding to a destination is received from the rail car controller, superimposes at least one modulated control signal on a power, and transmits it to the slave communication unit through a power supply line formed in the belt; and a slave communication device that supplies the power provided from the master communication unit to the gripper-unit having a plurality of gripper devices for performing a hoisting work, demodulates the modulated control signal using the corresponding carrier frequency, transmit the demodulated control signal to each gripper device corresponding to the corresponding identification information, modulates the signals applied from each gripper device by allocating different carrier frequencies, and transmits them to the master communication unit through the power supply line formed in the belt.

In addition, the gripper device includes a gripper-unit controller and at least one motor and at least one sensor connected to a gripper; and the slave communication unit communicates with the motor and the sensor connected to the gripper through the gripper-unit controller, directly communicates with the motor and the sensor, or communicates with the gripper device in a mixed form thereof.

In addition, the master communication unit and the slave communication unit simultaneously perform real-time communication and periodic communication with different gripper devices using different carrier frequencies.

In addition, the master communication unit and the slave communication unit divide the carrier frequency sections according to the communication system and the carrier frequency section assigned to a real-time communication and the carrier frequency section assigned to a periodic communication are set to different frequency sections.

In addition, the master communication unit and the slave communication unit analyze a signal transmission/reception waveform of the corresponding carrier frequency during mutual transmission/reception through the carrier frequency to detect a transmission level and a reception level, and then transmit them to the other side, respectively; and the master communication unit and the slave communication unit set their own transmission signal level and reception gain on the corresponding carrier frequency based on a difference value between the counterpart's transmission level and reception level.

In addition, the master communication unit and the slave communication unit analyze the signal transmission/reception waveform of the corresponding carrier frequency to detect a noise level for the corresponding carrier frequency; the transmission signal level and the reception gain are further adjusted to be proportional to the current noise level, when the detected noise level is less than the reference value; and a carrier frequency for the corresponding destination is reallocated to another carrier frequency in a dormant state or the transmission signal level and reception gain are adjusted, when the detected noise level exceeds the reference value.

In addition, the master communication device or the slave communication device adds CHECKSUM information for error detection for a signal to be transmitted through the power supply line to the signal and modulates and transmits the signal; and it analyzes a pattern of a RSSI (Received Signal Strength Indicator) of the received signal waveform, when error occurs in the CHECKSUM information at the time of demodulating the received signal and changes a bit data at a position having the previous RSSI difference value greater than or equal to the reference level, thereby restoring data.

In addition, the master communication unit and the slave communication unit are provided with a motion sensor for detecting the degree of movement of the corresponding position thereof, respectively; the slave communication unit transmits the slave motion information received from its motion sensor to the master communication unit; and the master communication unit compares the master motion information received from its motion sensor and the slave motion information to determine whether there is an abnormality in the gripper-unit or a guide rail, determines that the gripper-unit is in an abnormal state, when a movement of a certain level or more is detected in the slave communication unit in a state that the master communication unit is stopped, and determines that the rail car and the guide rail are in an abnormal state, when a movement of a certain level or more is detected in the slave communication unit in a state that the master communication unit detects a movement.

BRIEF DESCRIPTION OF THE DRAWINGS

The above and other objects, features and advantages of the present invention will be more apparent from the following detailed description taken in confluence with the accompanying drawings, in which:

FIG. 1A to FIG. 1C are diagrams illustrating a schematic configuration for explaining a hoist communication device in a rail car of an automated material handling system according to the present invention;

REFERENCE SIGNS LIST

Figures 1A, 1B:
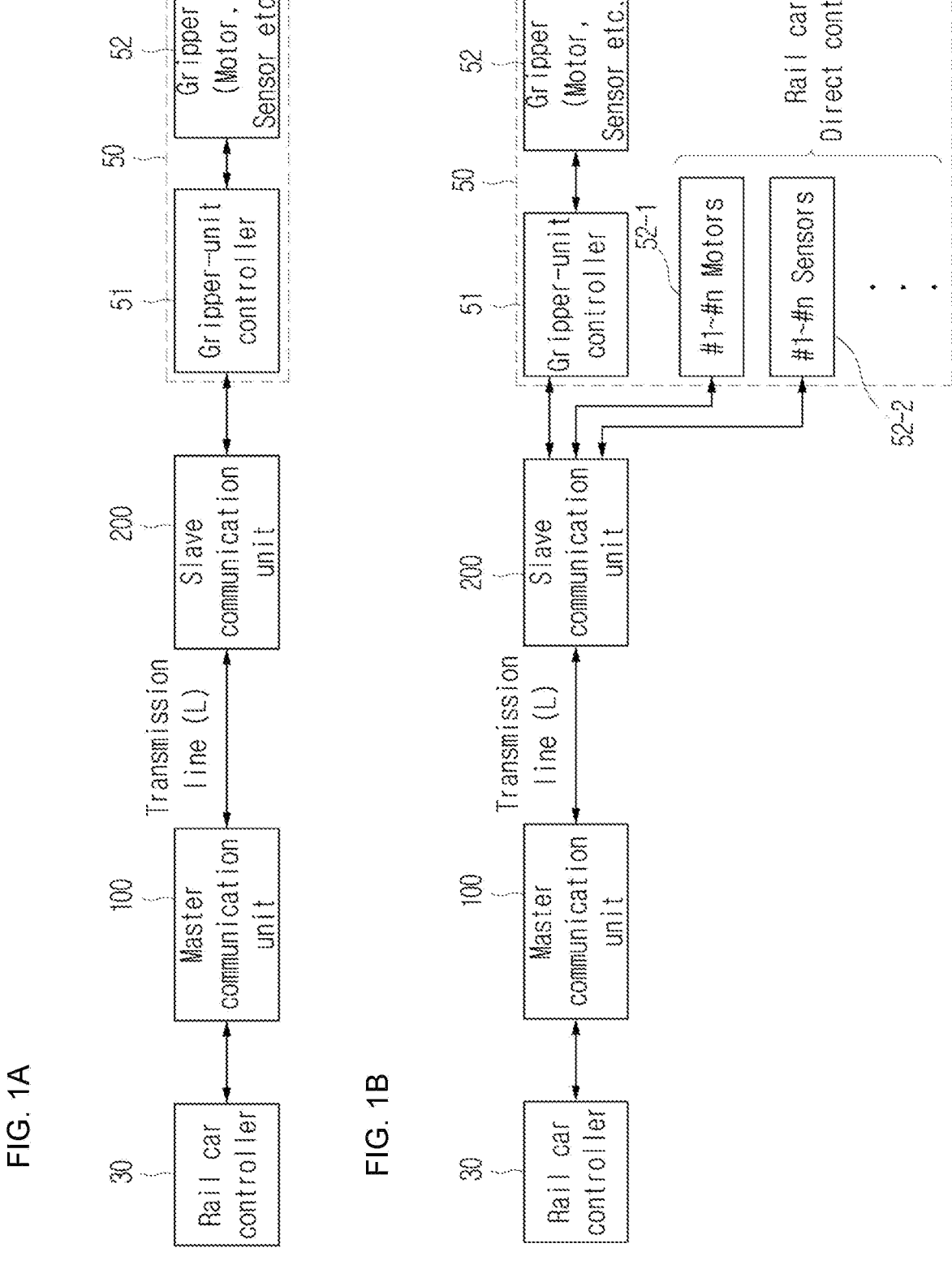

100: master communication unit
200: slave communication unit
110, 210: communication unit
120, 220: carrier frequency allocation unit
130, 230: modulation/demodulation unit
140, 240: power supply unit
150. 250: transmitting and receiving unit

160, 260: filtering unit
170, 270: signal measurement unit
180, 280: sensor
190. 290: control unit
30: rail car controller
50: gripper-unit
51: gripper-unit controller
52: gripper
52-1: motor
52-2: sensor
L: power supply line

DETAILED DESCRIPTION OF THE PREFERRED EMBODIMENT

Figure 1C:
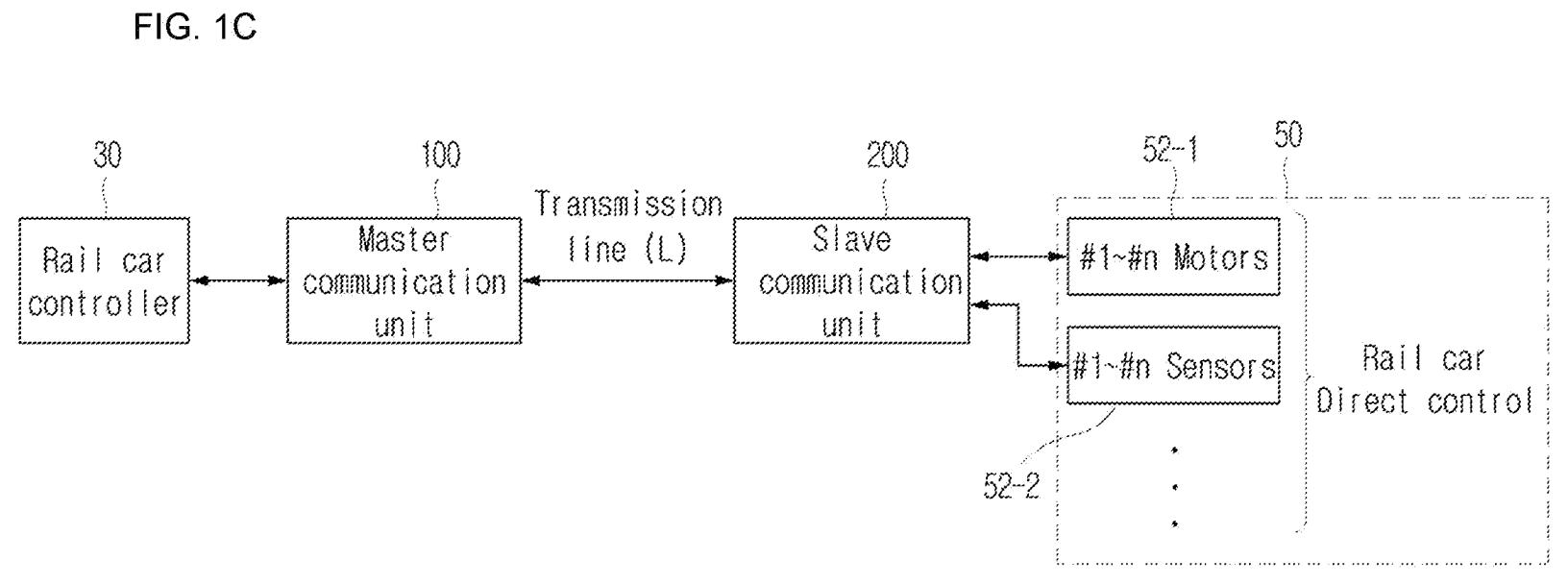

Hereinafter, a preferred embodiment according to the present invention will be described in detail with reference to the accompanying drawings. Since the description of the present invention is a mere embodiment for structural and functional description, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them. This invention can be implemented in many different forms without departing from technical aspects or main features. FIG. 1A to FIG. 1C are diagrams illustrating a main configuration for explaining a hoist communication device in a rail car of an automated material handling system according to the present invention.

Referring to FIG. 1A to FIG. 1C, the hoist communication device in the rail car of the automated material handling system according to the present invention includes a master communication unit (100) that communicates with a rail car controller (30) and a slave communication unit (200) that communicates with a gripper0unit (50). The master communication unit (100) and the slave communication unit (200) perform a power line communication through one power supply line (L) provided on a belt.

At this time, the rail car controller (30) controls overall operations for the rail car and transmits power and gripper control information to the gripper-unit (50) through the hoist communication device. The gripper-unit (50) collects information related to the gripper operation through the hoist communication device.

The master communication unit (100) is a device provided on the master side of the hoist communication device and transmits a power and a control signal for carrier transport or return to the slave communication unit (200) through the power supply line (L) provided on the belt. At this time, the master includes a lifting body (not illustrated) including a motor for lifting up and down the belt.

The slave communication unit (200) is a device provided on the slave side of the hoist communication device. The slave communication unit (200) provides the power supplied through the power supply line (L) provided in the belt as driving power of the gripper-unit (50) and provides a control signal for carrier transport or return received from the master communication unit (100) to the gripper-unit (50), thereby operating the gripper (52) in correspondence with the control signal.

In addition, the slave communication unit (200) transmits the state information of the gripper-unit (50) to the master communication unit (100).

The gripper-unit (50) may include a gripper-unit controller (51) and a plurality of gripper devices including at least one motor (52-1) and at least one sensor (52-2) provided in the gripper (52). The gripper-unit may further include a number of devices required when conveying the carrier to the gripper (52).

In this case, the motor (52-1) is not a simple motor, but a device including a control device necessary for motor control and controlled by the rail car controller (30). In addition, the sensor (52-2) includes a control device for controlling peripheral devices of the gripper using a sensor other than a simple sensor and is controlled by the rail car controller (30).

In addition, since the motor (52-1) and the sensor (52-2) may have different communication protocols, it can be configured as different communication systems that can transmit the corresponding information in real time or periodically transmit the corresponding information according to the location where the motor (52-1) is provided and the type of the sensor (52-2). For example, the motor (52-1) transmits driving information in real time to the rail car controller (30) through the hoist communication device and the first to third sensors (52-2) periodically transmit the gripper status information to the rail car controller (30) through the hoist communication device.

That is, the present invention has a main feature in that the master communication unit (100) and the slave communication unit (200) perform power line communication through one power supply line (L) provided on the belt and it performs individual communications with a plurality of gripper devices having different communication systems. Accordingly, the master communication unit (100) and the slave communication unit (200) may simultaneously perform real-time communication and periodic communication with different gripper devices using different carrier frequencies.

Also, when communicating with the gripper-unit (50), the rail car controller (30) controls only one motor (52-1) among the gripper devices, and sometimes controls a plurality of motors (52-1). In addition, the communications with the gripper-unit (50) can be performed in various combinations depending on the intended use such as a reception of sensing information through one sensor (52-2) and a reception of sensing information through a plurality of sensors (52-2).

That is, according to the present invention, as shown in FIG. 1A, the rail car controller (30) communicates with the gripper devices via the gripper-unit controller (51) through the hoist communication device. In addition, as shown in FIG. 1B, the rail car controller (30) communicates with the gripper devices via the gripper-unit controller (51) and communicates directly with other gripper devices including the motor (52-1) or the sensor (52-2) through the hoist communication device. Moreover, as shown in FIG. 1C, it can be applied and implemented to a structure that the rail car controller (30) only communicates directly with the gripper devices through the hoist communication device.

Figure 2:
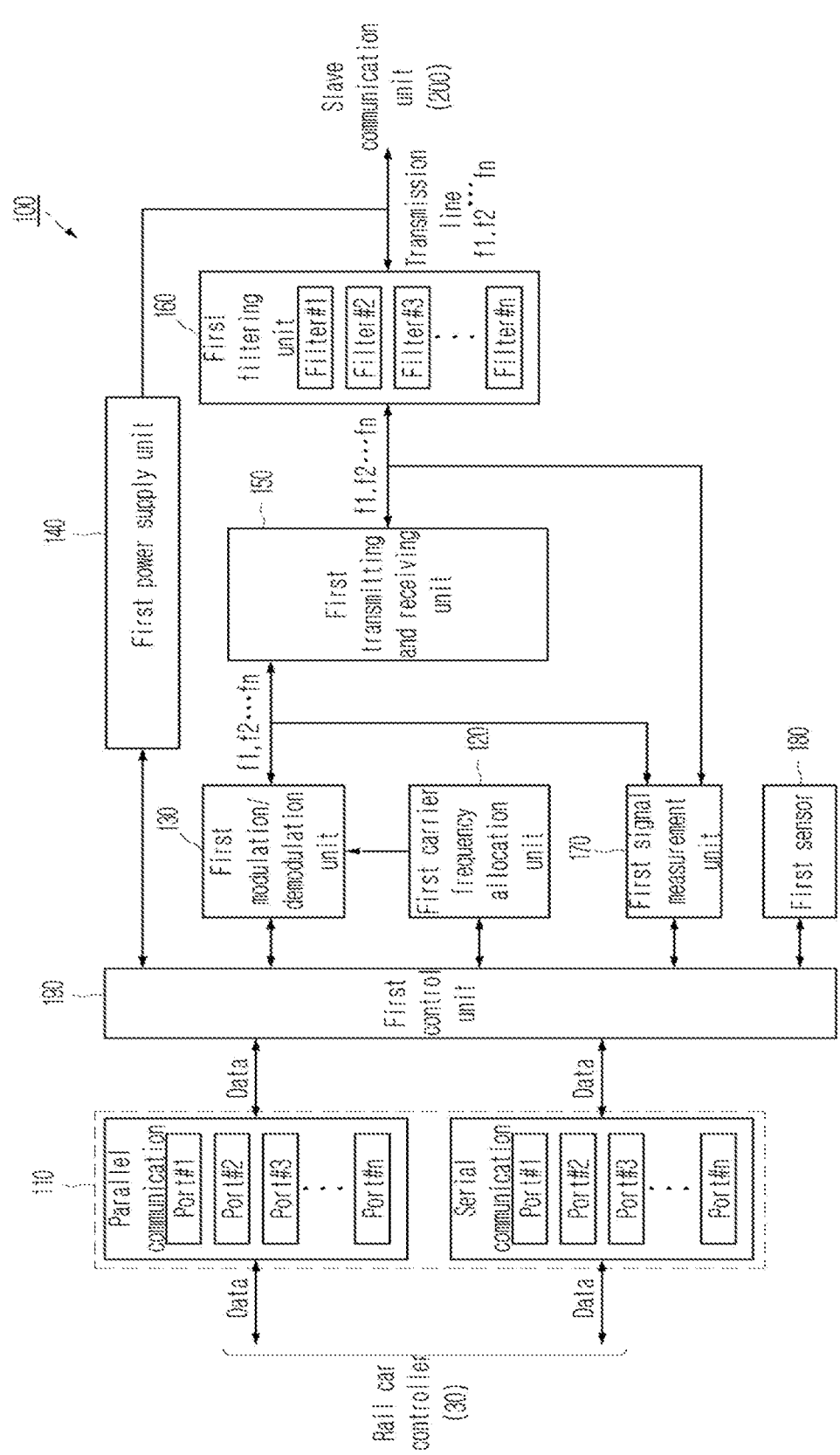
FIG. 2 is a block diagram functionally illustrating an internal configuration of the master communication unit illustrated in FIG. 3A to FIG. 3C.

FIG. 2 is a block diagram functionally illustrating an internal configuration of the master communication unit (100) illustrated in FIG. 1A through FIG. 1C.

Referring to FIG. 2, the master communication unit (100) includes a first communication unit (110), a first carrier frequency allocation unit (120), a first modulation/demodulation unit (130), a first power supply unit (140), a first transmitting and receiving unit (150), a first filtering unit (160), a first signal measurement unit (170), a first sensor (180), and a first control unit (190).

The first communication unit (110) is an interface means for communicating with the rail car controller (30), and includes a parallel communication unit having a plurality of communication ports (Port #1 to Port #n) that performs a parallel communication and a serial communication unit having a plurality of communication ports (Port #1 to Port #n) that performs a serial communication.

The first carrier frequency allocation unit (120) allocates a carrier frequency to modulate a signal to be transmitted to the gripper-unit (50) side under the control of the first controller (190) and allocates a carrier frequency to demodulates a signal received through the power supply line (L).

The first modulation/demodulation unit (130) outputs a signal obtained by modulating the signal applied from the first control unit (190) using the carrier frequency selected by the first carrier frequency allocation unit (120) to the first transmitting and receiving unit (150) and demodulates a modulated signal received from the first transmitting and receiving unit (150) to be transmitted to the rail car controller (30) side.

The first power supply unit (140) supplies a power supplied from the outside including the rail car controller (30) as the driving power of the master communication unit (100) and supplies it to the gripper-unit (50) through the power supply line (L). At this time, the first power supply unit (140) may measure the voltage level of the signal transmitted through the transmission line (L) and transmit it to the first control unit (190).

The first transmitting and receiving unit (150) transmits at least one modulation signal modulated with different carrier frequencies by the first modulation/demodulation unit (130) to the first filtering unit (160) and transmits the modulation signal, which is received from the first filtering unit (160), to the first modulation/demodulation unit (130).

The first filtering unit (160) transmits the master modulation signal carried on a different carrier frequency through the first transmitting and receiving unit (150) to the transmission line (L) and filters the slave modulation signal received through the transmission line (L) according to the carrier frequency to be transmitted to the first transmitting and receiving unit (150). In this case, a plurality of first filtering units (160) is provided to correspond to the allocatable carrier frequencies. For example, when the power line communication is performed using the first to N-th carrier frequencies through the power supply line (L), first to N-th filters are provided.

The first signal measurement unit (170) measures the signal level and noise level for each carrier frequency on the slave modulation signal received through the power supply line (L) and the master modulation signal to be transmitted through the transmission line (L) in real time to be provided to the first control unit (190).

Figure 3:
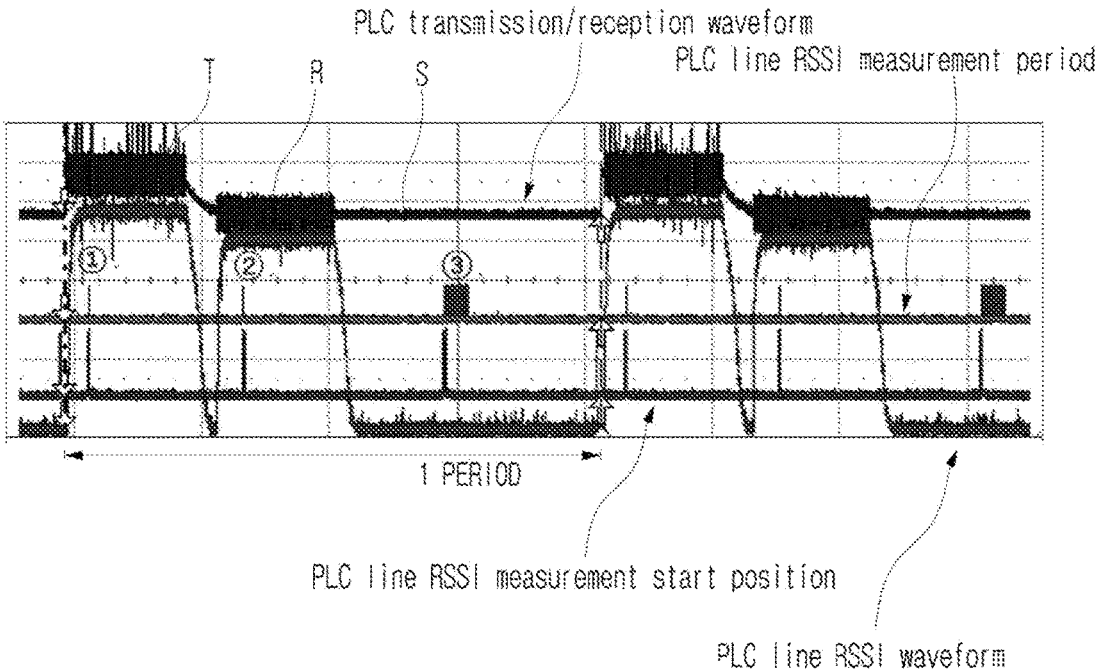
FIG. 3 is a diagram for explaining a signal measurement method performed by a first signal measurement unit shown in FIG. 2.

That is, as shown in FIG. 3, the communication period (25 ms) of the modulation signal to be transmitted and received through the power supply line (L) includes a transmission signal (T), a reception signal (R), and a waiting period(S). Therefore, during the communication between the master communication unit (100) and the slave communication unit (200) every time, the first signal measurement unit (170) repeatedly measures the RSSI (Received Signal Strength Indicator) at the position (1) in FIG. 3 and detects the transmission signal level based on the average value thereof in real time, repeatedly measures the RSSI (Received Signal Strength Indicator) at the position 2 in FIG. 3 and detects the transmission signal level based on the average value thereof in real time, and extracts the maximum and minimum values thereof by repeatedly measuring the RSSI at position 3 in FIG. 3 and then, detects the noise level using the difference value between them.

The first sensor (180) may include at least one sensor for detecting the hoist status on the master side, and in particular includes a motion sensor for detecting the motion status.

The first control unit (190) controls the overall operation of the master communication unit (100), and is provided with a memory for storing various reference information including a carrier frequency band and a standard judgement of the allocation for each carrier frequency and various types of information processed by the first control unit (190).

The first control unit (190) modulates the data using different carrier frequencies according to the destination of the data to be transmitted to the slave communication unit (200), and then transmits the modulated data to the slave communication unit (200). The first control unit (190) assigns one identification code corresponding to a destination among a plurality of gripper devices provided in the gripper-unit (50) to the header area of the transmission packet.

At this time, the first control unit (190) sequentially allocates one of the carrier frequencies currently in a dormant state and obtains the noise level for each carrier frequency of the signal which is currently being transmitted/received. When the noise level is above a certain level, a data transmission is performed by newly allocating another carrier frequency that is currently in a dormant state or adjusting the transmission level and the reception gain. Here, when a communication omission occurs during periodic communication, the first control unit (190) checks the noise level on the corresponding carrier frequency after communication is stopped, and resumes the communication when the noise level is less than a preset reference level. However, when the noise level is equal to or higher than the reference level, a new carrier frequency may be newly allocated for the corresponding periodic communication.

In addition, the first control unit (190) receives the slave transmission level, the slave reception level, and the noise level information for each carrier frequency currently being transmitted and received from the slave communication unit (200) and adjust the transmission level and the reception gain based on the difference between the slave transmission level and the slave reception level. For example, if the slave transmission level is greater than the preset reference level based on the slave reception level, the master transmission signal level and the reception gain are weakly adjusted. In addition, if the slave transmission level is less than the preset reference level based on the slave reception level, the master transmission signal level and the slave reception gain is strongly adjusted, so that the transmission/reception signal in the slave communication unit (200) has the same signal strength even in an environment in which the power level state and the power line communication environment are frequently changed due to the movement of the belt or the like.

In addition, the first control unit (190) may finely adjust the strength of the master transmission signal in consideration of the electrical stability of the device including circuit damage in adjusting the master transmission signal level and the reception gain.

In addition, the first control unit (190) may differentiate between a state in which there is no noise and a state in which there is noise by cumulatively analyzing the difference between the slave transmission level and the slave reception level. Also, it is possible to finely adjust the master transmission signal, change the carrier frequency, or finely adjust the reception gain according to the presence of noise.

Figure 4:
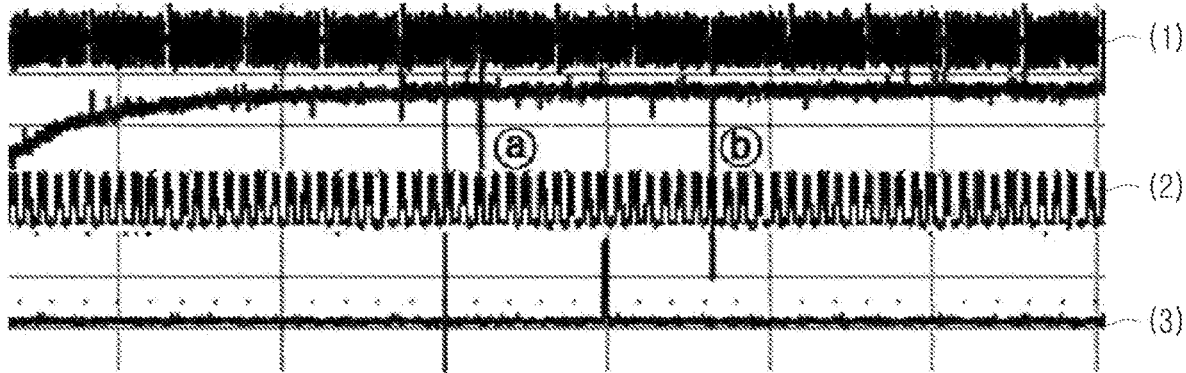
FIG. 4 is a diagram for explaining a method of automatically restoring data based on checksum information in a first control unit shown in FIG. 2.

In addition, the first control unit (190) generates checksum information for error detection with respect to the control signal provided to the slave communication unit (200) and provides it to the first modulation/demodulation unit (130), so that it controls to perform modulation processing in addition to data packets of the corresponding control signal. Also, when an error occurs in the checksum information received from the slave communication unit (200), the data is automatically restored by analyzing the signal waveform of the corresponding reception signal. That is, the first control unit (190) first measures the power supply line transmission/reception waveform ((1) of FIG. 4) when receiving the signal from the slave communication unit (200). Then, when a checksum error occurs, it analyzes the RSSI value pattern ((2) in FIG. 4) from the corresponding power supply line transmission/reception waveform ((1) of FIG. 4)) and check the bit ((ⓐ) and (ⓑ) in FIG. 4(2)) of the noise location with a high relative difference in comparison with the previously checked RSSI value among the RSSI values, thereby changing the data of the corresponding bit (0↔1). For example, when the bit data corresponding to the noise position of the received signal is "1", it is changed to "0", and when the bit data corresponding to the noise position of the received signal is "0", it is changed to "1". Also, after restoring the reception data by referring to the previous reception data, the checksum information is checked, and if the checksum is normal, the reception success processing is performed.

Also, the first control unit (190) provides the demodulated signal from the first modulation/demodulation unit (130) to the rail car controller (30). In this case, the demodulated signal may be a response signal, communication state information, and operation state information etc. related to the hoist operation received from the slave communication unit (200).

In addition, the first control unit (190) compares the master motion information collected from the first sensor (180), more specifically the motion sensor, with the slave motion information received from the slave communication unit (200), so that it monitors the condition of the rail car or the guide rail. That is, when the master communication unit (100) is stopped and the slave communication unit (200) detects a movement deviating from a certain standard, for example, shaking or impact from side to side, it can be determined that the gripper-unit (50) is in an abnormal state. Also, when the master communication unit (100) detects a movement and the slave communication unit (200) detects a movement out of a certain standard, for example, a downward movement or left-right shaking, it can be determined that the movement of the rail car and the guide rail are in an abnormal state. Moreover, if it is determined that an abnormality has occurred in the rail car or the guide rail, this may be reported to the manager terminal or upper manager to request timely maintenance of the problematic parts related to the movement of the rail car.

Figure 5:
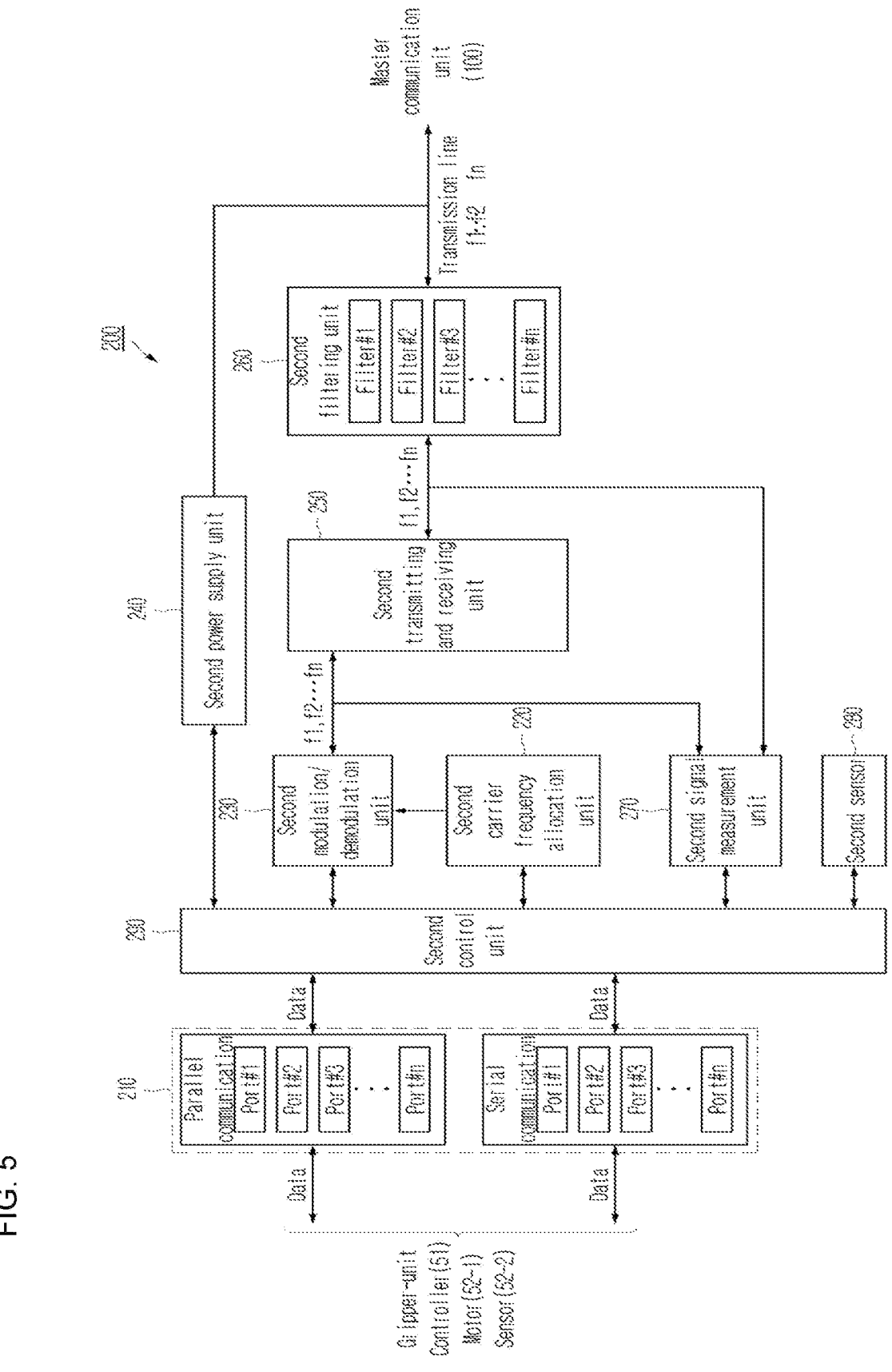
FIG. 5 is a block diagram functionally illustrating an internal configuration of a slave communication unit illustrated in FIG. 1A through FIG. 1C.

FIG. 5 is a block diagram functionally illustrating an internal configuration of the slave communication unit (200) illustrated in FIG. 2.

Referring to FIG. 5, the slave communication unit (200) includes a second communication unit (210), a second carrier frequency allocation unit (220), a second modulation/demodulation unit (230), a second power supply unit (240), a second transmitting and receiving unit (250), a second filtering unit (260), a second signal measurement unit (270), a second sensor (280), and a second control unit (290). Here, the slave communication unit has the same components as the master communication unit (100), except that the second communication unit (210) is configured to communicate with a plurality of gripper-devices or gripper-unit controllers provided in the gripper-unit (50). Hereinafter, descriptions of the configurations and functions of the devices performing the same functions as the master communication unit (100) or omitted here.

In FIG. 5, the second sensor (280) may further include a motion sensor, a gyro sensor, an acceleration sensor, a tilt sensor, and the like. By using these sensors, a movement distance, a movement speed, a left and right shaking, an impact, etc. of the belt are detected to be provided to the second control unit (290).

Like the first control unit (190) of the master communication unit (100), the second control unit (290) sets a communication path between the plurality of gripper devices and the rail car controller (30) using different carrier frequencies and controls to perform the power line communication through the power supply line (L) by allocating a carrier frequency in a dormant state. At this time, after the second control unit (290) modulates various kinds of slave information including slave communication status information having the slave transmission level, the slave reception level, and the noise level for each carrier frequency, slave status information detected by the second sensor unit (280), and response information corresponding to the control signal received from the master communication unit (100) by using different carrier frequencies, it is controlled to be transmitted to the master communication unit (100) through the power supply line (L).

In addition, the second control unit (290) demodulates the control signal for the operation of the gripper-unit (50) applied from the master communication unit (100) according to each carrier frequency, extracts the identification code corresponding to the destination from the demodulated data packet, and directly transmits the corresponding data packet to the gripper device corresponding to the extracted identification code.

Figure 6:
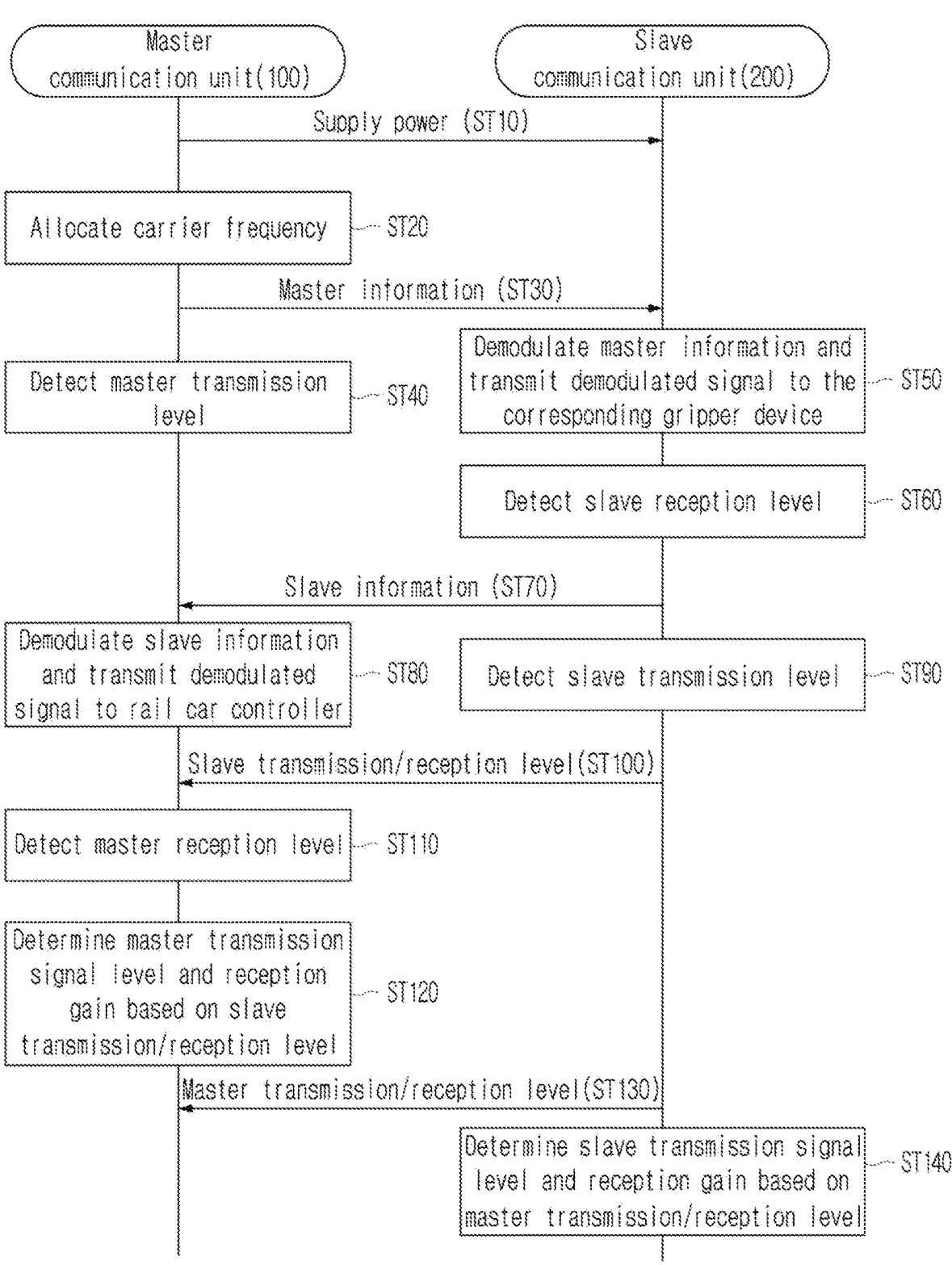
FIG. 6 is a diagram for explaining a hoist communication method in a rail car of an automated material handling system.

Subsequently, the operation of the hoist communication device in the rail car of the automated material handling system with the configuration described above will be described with reference to the flow chart illustrated in FIG. 6.

Hereinafter, the communicating method between the master communication unit (100) and the slave communication unit (200) will be described by applying it to a lifting down operation of the gripper-unit.

When the rail car moves through a rail and stops at a manufacturing facility position to work, the master communication unit (100) drives the belt to lift down the gripper-unit (50) to be positioned at the manufacturing facility.

In the state, the master communication unit (100) supplies a predetermined level of power, which is supplied from the outside thereof, to the slave communication unit (200) through the power supply line (L) formed in the belt according to the control of the rail car controller (30) and the slave communication unit (200) sets the gripper-unit (50) in an operation standby state (ST10).

In the above state, when the master information for hoisting work is received from the rail car controller (30), the master communication unit (100) allocates one carrier frequency among the carrier frequencies in the dormant state, for example, a first carrier frequency, modulates the corresponding master information using the allocated first carrier frequency, and superimposes the modulated master information on the power, and then transmits it to the slave communication unit (200) through the power supply line (L) (ST20, ST30).

At this time, the rail car controller (30) provides the gripper control information including a gripper device ID for receiving the corresponding data to the master communication unit (100) and the master communication unit (100) transmits the master information including the gripper device ID to the slave communication unit (200).

In this case, the carrier frequency band may be preset so that the range of the carrier frequency is divided into a first section and a second section according to the communication system. Accordingly, in the step (ST20), the master communication unit (100) allocates a dormant carrier frequency of a section corresponding to the communication system which corresponds to the gripper device ID. For example, the first section is a range of the carrier frequency set when performing real-time communication with the motor of the gripper-unit (50) and the second section is a range of the carrier frequency range set when performing periodic communication with the sensor of the gripper-unit (50).

In addition, the master communication unit (100) may add the checksum information for error detection to the packet including the master information to be transmitted to the slave communication unit (200).

In addition, the master communication unit (100) transmits the data through the power supply line (L) in the step ST30 and analyzes the transmission signal waveform for the corresponding first carrier frequency to detect the master transmission level (ST40).

On the other hand, the slave communication unit (200) demodulates the master information received through the power supply line (L) to the corresponding carrier frequency and transmits the demodulated gripper control signal to the gripper device corresponding to the corresponding ID to operate the gripper-unit (50). For example, the slave communication unit (200) may transmit the demodulated data to the motor (52-1), the sensor (52-2), or the gripper-unit controller (51).

In the step ST50, the slave communication unit (200) checks the checksum information of the corresponding packet and analyzes the RSSI pattern of the corresponding master reception signal waveform in case of checksum error to change the bit data of the position having the RSSI difference value greater than or equal to the preset reference level, thereby automatically restoring the master information.

In addition, the slave communication unit (200) detects the slave reception level by analyzing the reception signal waveform for the carrier frequency received through the power supply line (L) in the step ST50 (ST60).

In addition, the slave communication unit (200) modulates the slave information by allocating a carrier frequency in the dormant state, and then transmits it to the master communication unit (100) through the power supply line (L) (ST70). In this case, the slave information includes response information on the master information received in the step ST30 or gripper status information detected by the sensor (52-2).

In the step ST70, the slave communication unit (200) generates a packet including the gripper device ID to be transmitted. At this time, the packet can be transmitted in real time or periodically according to the gripper device ID. Here, a carrier frequency in the dormant state is allocated in a preset carrier frequency section based on such a communication system.

Then, the master communication unit (100) demodulates the slave information received through the slave communication unit (200) using the corresponding carrier frequency and then, transmits it to the rail car controller (30) (ST80).

In the meantime, the slave communication unit (200) transmits the slave information through the power supply line (L) in the step ST70 and analyzes the transmission signal waveform for the corresponding carrier frequency to detect the slave transmission level (ST90).

Then, the slave communication unit (200) transmits the slave reception level for the corresponding carrier frequency detected in the step ST60 and the slave transmission level information for the corresponding carrier frequency detected in the step ST90 to the master communication unit (100) (ST100). In this case, the slave communication unit (200) may transmit the slave transmission level and reception level information to the master communication unit (100) as the first carrier frequency corresponding to the transmission/ reception level information.

The master communication unit (100) analyzes the slave signal waveform received through the slave communication unit (200) to detect the master reception level for the corresponding carrier frequency (ST110).

In addition, the master communication unit (100) determines the master transmission signal level to be transmitted as the corresponding carrier frequency by using the slave reception level and the transmission level received in the step ST100 (ST120). At this time, the master communication unit (100) may set the transmission level and the reception gain so that the signal level transmitted and received through the corresponding carrier frequency is kept constant based on the difference between the slave transmission level and the slave reception level for the corresponding carrier frequency.

In addition, in the step ST120, the master communication unit (100) detects the noise level for the corresponding carrier frequency. In this case, when no noise is detected, it sets the signal transmission level based on the difference between the slave transmission level and the slave reception level. Also, when the noise level is detected, the transmission signal level may be further adjusted to be higher in proportion to the noise level.

Then, in the step ST120, when the noise level of the corresponding carrier frequency exceeds a preset criterion, the master communication unit (100) can newly allocate another dormant carrier frequency on the corresponding destination or adjust the transmission level and the reception gain.

In addition, the master communication unit (100) transmits the master transmission level of the corresponding carrier frequency detected in the step ST40 and the master reception level information detected in the step ST110 to the slave communication unit (200) (ST130). At this time, the master communication unit (100) transmits the master transmission/reception level information as the transmission level of the corresponding carrier frequency set in the step ST120.

On the other hand, the slave communication unit (200) sets the slave transmission level and the reception gain so that the transmission/reception level is kept constant based on the difference between the master transmission level and the master reception level for the corresponding carrier frequency received in the step ST130. Thereafter, for the corresponding carrier frequency, the slave information is transmitted based on a preset slave transmission level (ST140).

In the step ST140, the slave communication unit (200) may reset the slave transmission level and the reception gain or reallocate the carrier frequency in consideration of the noise level of the carrier frequency, similarly to the master communication unit (100).

In addition, the slave communication unit (200) receives the state detection signal provided from the second sensor (280) and transmits the state detection signal level to the master communication unit (100) using the carrier frequency at a predetermined period. Also, the master communication unit (100) analyzes the slave state information received from the slave communication unit (200) and the master state information sensed through the first sensor (180) to detect an abnormal state of the rail car or the guide rail. In addition, when the abnormal state thereof is detected, an abnormal state alarm processing of transmitting it to the rail car controller (30) may be performed.

According to the present invention, the control signal required for the hoist work is transmitted and received in the form of a modulated signal through one power supply line embedded in the belt and the rail car controller and the plurality of devices provided in the gripper-unit perform mutually individual communication, so that the rail car controller may perform the optimal communication with each device having different communication protocols provided in the gripper.

While the present invention has been described with respect to the specific embodiments, it will be apparent to those skilled in the art that various changes and modifications may be made without departing from the spirit and scope of the invention as defined in the following claims.

What is claimed is:

1. A hoist communication device in a rail car of an automated material handling system, in which a master communication device connected to a rail car controller and a slave communication device connected to a gripper-unit are connected through a belt to operate the gripper-unit in accordance with a control signal of the rail car controller, thereby performing a hoist work, the hoist communication device comprising:

the master communication device that allocates different carrier frequencies for each gripper device identification information to be modulated, when a control signal including the gripper device identification information corresponding to a destination is received from the rail car controller, superimposes at least one modulated control signal on a power supply line, and transmits the modulated control signal to the slave communication unit through the power supply line formed in the belt; and a slave communication device that supplies the power provided from the master communication unit to the gripper-unit having a plurality of gripper devices for performing the hoisting work, demodulates the modulated control signal using the corresponding carrier frequency, transmit the demodulated control signal to each gripper device corresponding to the corresponding identification information, modulates sensor signals applied from each gripper device by allocating different carrier frequencies, and transmits the sensor signals to the master communication unit through the power supply line formed in the belt.

2. The hoist communication device according to claim 1, wherein the gripper device includes a gripper-unit controller and at least one motor and at least one sensor connected to a gripper; and the slave communication unit communicates with the motor and the sensor connected to the gripper through the gripper-unit controller, directly communicates with the motor and the sensor, or communicates with the gripper device in a mixed form thereof.

3. The hoist communication device according to claim 1, wherein the master communication unit and the slave communication unit simultaneously perform real-time communication and periodic communication with different gripper devices using different carrier frequencies.

4. The hoist communication device according to claim 3, wherein the master communication unit and the slave communication unit divide the carrier frequency sections according to the communication system and the carrier frequency section assigned to a real-time communication and the carrier frequency section assigned to a periodic communication are set to different frequency sections.

5. The hoist communication device according to claim 1, wherein the master communication unit and the slave communication unit analyze a signal transmission/reception waveform of the corresponding carrier frequency during mutual transmission/reception through the carrier frequency to detect a transmission level and a reception level, and then transmit the transmission level and the reception level to the other side, respectively; and the master communication unit and the slave communication unit set their own transmission signal level and reception gain on the corresponding carrier frequency based on a difference value between the counterpart's transmission level and reception level.

6. The hoist communication device according to claim 5, wherein the master communication unit and the slave communication unit analyze the signal transmission/reception waveform of the corresponding carrier frequency to detect a noise level for the corresponding carrier frequency; the transmission signal level and the reception gain are further adjusted to be proportional to the current noise level, when the detected noise level is less than the reference value; and a carrier frequency for the corresponding destination is reallocated to another carrier frequency in a dormant state or the transmission signal level and the reception gain are adjusted, when the detected noise level exceeds the reference value.

7. The hoist communication device according to claim 1, wherein the master communication device or the slave communication device adds CHECKSUM information for error detection for a signal to be transmitted through the power supply line to the signal and modulates and transmits the signal; and the master communication device or the slave communication device analyzes a pattern of a RSSI (Received Signal Strength Indicator) of the received signal waveform, when error occurs in the CHECKSUM information at the time of demodulating the received signal and changes a bit data at a position having the previous RSSI difference value greater than or equal to the reference level, thereby restoring data.

8. The hoist communication device according to claim 1, wherein the master communication unit and the slave communication unit are provided with a motion sensor for detecting the degree of movement of the corresponding position thereof, respectively; the slave communication unit transmits the slave motion information received from its motion sensor to the master communication unit; and the master communication unit compares the master motion information received from its motion sensor and the slave motion information to determine whether there is an abnormality in the gripper-unit or a guide rail, determines that the gripper-unit is in an abnormal state, when a movement of a certain level or more is detected in the slave communication unit in a state that the master communication unit is stopped, and determines that the rail car and the guide rail are in an abnormal state, when a movement of a certain level or more is detected in the slave communication unit in a state that the master communication unit detects a movement.

* * * * *